United States Patent [19]
Ashkin

[11] 3,710,279
[45] Jan. 9, 1973

[54] APPARATUSES FOR TRAPPING AND ACCELERATING NEUTRAL PARTICLES

[75] Inventor: Arthur Ashkin, Rumson, N.J.

[73] Assignee: Bell Telephone Laboratories, Incorporated, Murray Hill, Berkeley Heights, N.J.

[22] Filed: Dec. 15, 1969

[21] Appl. No.: 885,070

[52] U.S. Cl............331/94.5, 250/41.9 DS, 55/529
[51] Int. Cl............................H01s 3/06, H01s 3/09
[58] Field of Search..250/41.9 DS, 41.9 G; 331/94.5; 55/529

[56] References Cited

UNITED STATES PATENTS

| | | | |
|---|---|---|---|
| 3,360,733 | 12/1967 | Vali et al. | 328/233 |
| 3,532,879 | 10/1970 | Braunstein et al. | 250/41.9 DS |
| 3,558,877 | 1/1971 | Pressman | 250/41.9 G |

*Primary Examiner*—William L. Sikes
*Assistant Examiner*—R. J. Webster
*Attorney*—R. J. Guenther and Arthur J. Torsiglieri

[57] ABSTRACT

There is disclosed a variety of apparatuses for controlling by radiation pressure the motion of a particle free to move with respect to its environment, based on the discovery that one or more beams of optical radiation can have frequency, diverging shape or intensity selected for a controlled radiation-pressure interaction with the particle that overpowers gravity and collision effects of atoms and molecules and overpowers any photophoresis interaction of the particle and its environment due to a heating effect of said particle upon its environment. The disclosed results of the effect of the radiation pressure on the motion of the particle include controllably heating the particle to provide a black-body point light source, bombardment of a sample target with such particles, very high energy particle acceleration, strong-focusing acceleration of a neutral particle, isotope separation, gas pumping, separation of particles by size, population inversion based on radiation-pressure separation of excited species, vacuum deposition of thin films from ultrapure particles controllably vaporized while held by radiation pressure, tensile-strength testing of materials based on the radiation-pressure effect of circularly polarized light, contaminant-free trapping or bottling of neutral gases, molecular beam separation and deflection, acceleration measurement for inertial guidance and measurement of very low gas pressures.

6 Claims, 15 Drawing Figures

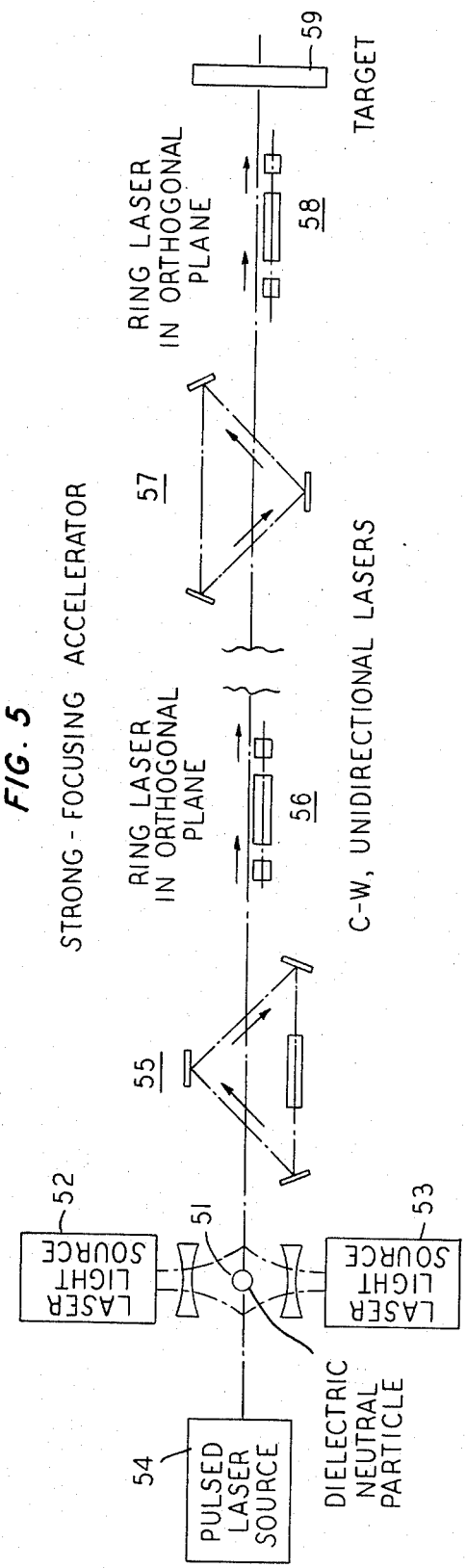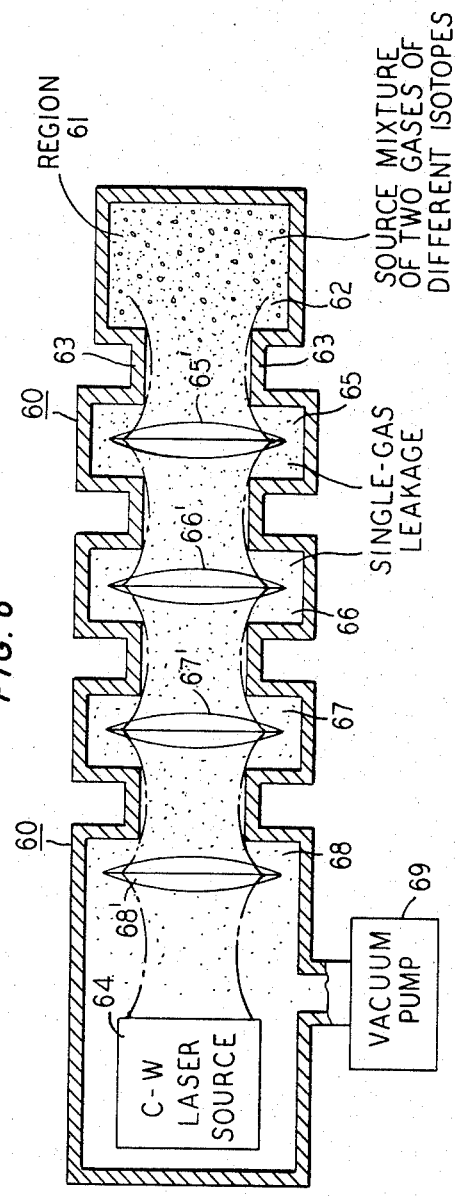

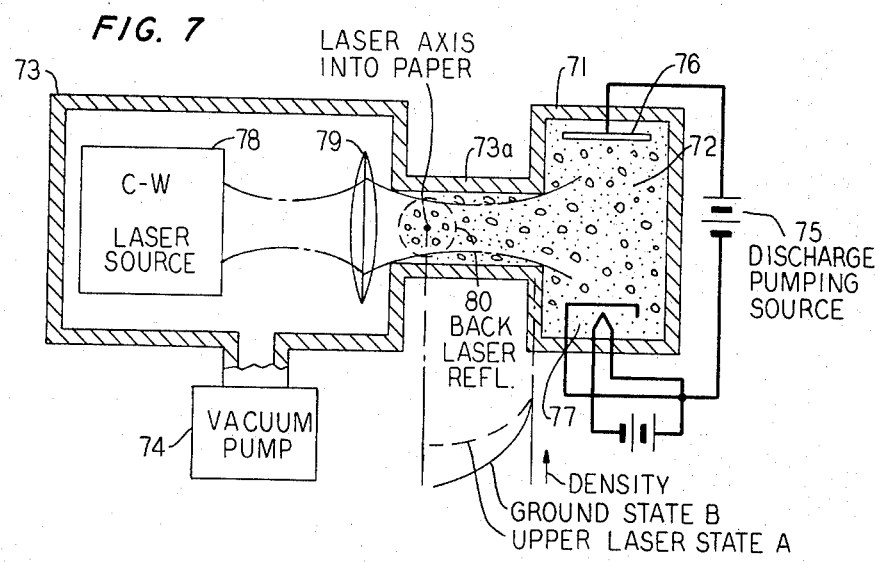
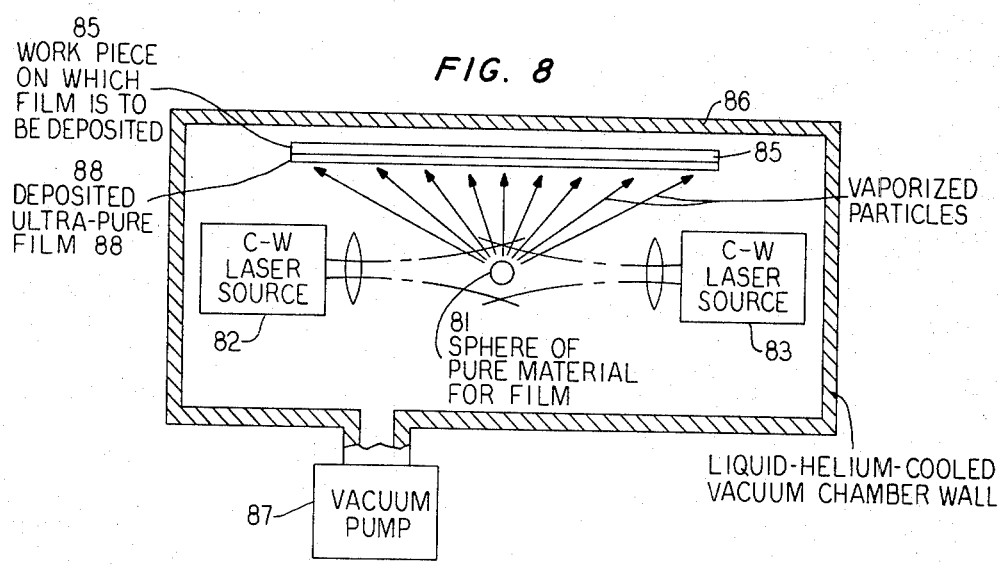
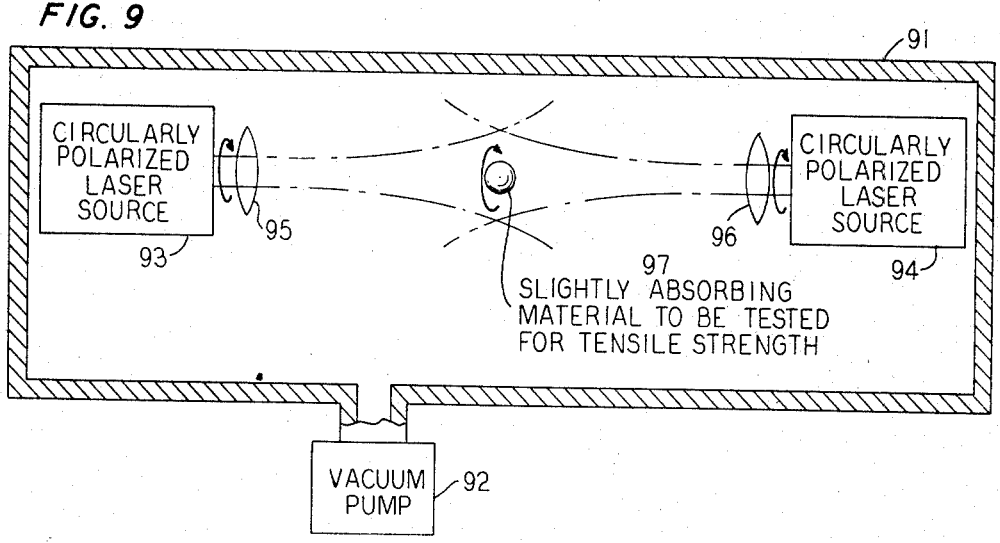

APPARATUSES FOR TRAPPING AND ACCELERATING NEUTRAL PARTICLES

BACKGROUND OF THE INVENTION

This invention relates to the controlled use of the effects of radiation pressure upon particles free to move with respect to their environment, especially neutral particles.

Historically, radiation pressure is a physical effect that has been occasionally studied in the laboratory but has been consistently considered to be of no practical interest because of the obscuring effects of thermal forces. These thermal forces are caused by temperature gradients in the medium surrounding an object and, in general, are termed radiometric forces. When the gradients are caused by light specifically and the resulting thermal force moves the entire particle, the effect is called photophoresis. Radiometric forces and photophoresis, in particular, are usually orders of magnitude larger than the force due to radiation pressure. Even in the typical experiment with a laser radiation source, photophoresis usually completely obscures radiation pressure. For example, see the article by A. D. May et al., Journal of Applied Physics, Vol. 38, page 5290 (1967). While it has been postulated by A. V. Kats et al., JETP Letters, Vol. 9, page 192 (1969), that radiation pressure can deform so-called free surfaces of a liquid in opposition to surface-tension forces, no practical use of radiation pressure with neutral particles free to move with respect to their environment has been envisioned.

Heretofore, many techniques, such as synchrotron techniques, have been known for trapping and accelerating charged particles, but no really effective techniques are known for producing similar results with neutral particles.

SUMMARY OF THE INVENTION

I have discovered that small particles, molecules and atoms free to move with respect to their environment can be trapped in stable optical potential wells or controllably accelerated using only the forces of radiation pressure from sources of beams of optical radiation having selected frequency, shape and intensity. My discovery includes the first observation of the acceleration of such particles by the forces of radiation pressure from visible laser light. The experiments, performed on micron-size particles in liquids and gas, have yielded new insights into the nature of the radiation pressure force and have led to the discovery of stable optical potential wells in which such particles were trapped by radiation pressure alone.

More specifically, in my experiments radiometric effects such as photophoresis were avoided by supplying relatively transparent particles in relatively transparent media or in vacuum, or by controlling the heating of slightly absorptive particles. I was able to obtain substantial freedom from deleterious thermal effects at power densities 1000 times the particle densities of the above-cited A. D. May et al. reference.

According to other aspects of my invention, it is feasible to utilize radiation-pressure effects by controlling the heating of the particle or the thermal interaction of the particle and its environment, even when thermal effects are not substantially absent. For example, a high-intensity black-body point source of light suitable for use in a spectrometer can be provided in an apparatus based on this aspect of my invention.

Various specific features of my invention also stem, in part, from an appreciation of the large magnitude of force achievable by radiation pressure from a coherent light source as contrasted to an incoherent light source and from an appreciation of the variety of its uses when disturbing thermal effects are avoided or suitably controlled.

Specifically, I have found that in all species of my invention it is advantageous to provide an environment around the neutral particle or particles such that thermal effects influence the motion of the particle substantially less than the effect of the radiation pressure.

According to one subsidiary feature of my invention, at least two beams of substantially monochromatic coherent diverging light are supplied to a region of mutual intersection or overlap in order to trap the particle or particles in that region.

According to another subsidiary feature of my invention, another beam of substantially monochromatic coherent light is controlled and directed upon the trapped particle to accelerate it out of the trapping region toward a suitable target. Thus, such acceleration of particles can be made to simulate the effects of micrometeoroids in outer space and micrometeorites which fall to earth, to induce high-energy chemical interactions or to generate certain types of useful signals.

According to still another subsidiary feature of my invention, radiation pressure can be selectively employed to impart angular momentum from the light photons to trapped particles. In one exemplary embodiment of my invention, this effect is employed to test the tensile strength of materials in an environment which can be rendered free of contamination and other spurious effects or to measure very small amounts of optical absorption.

BRIEF DESCRIPTION OF THE DRAWING

Many other species, features and advantages of my invention will become apparent from the following detailed description, taken together with the drawing, in which:

FIG. 5 is a partially pictorial and partially block-diagrammatic illustration of a strong-focusing neutral-particle accelerator according to my invention;

FIG. 6 is a partially pictorial and partially block-diagrammatic illustration of a gas-phase isotope-separation apparatus according to my invention;

FIG. 7 is a partially pictorial and partially block-diagrammatic illustration of a new laser light source in which excited species are separated by radiation pressure;

FIG. 8 is a partially pictorial and partially block-diagrammatic illustration of a vacuum deposition apparatus according to my invention;

FIG. 9 is a partially pictorial and partially block-diagrammatic illustration of a tensile-strength testing apparatus according to my invention;

DESCRIPTION OF THE ILLUSTRATIVE EMBODIMENTS

Theoretical and Experimental Basis of the Invention

One of my typical experiments uses transparent polystyrene spheres of 0.59 microns and 1.31 microns diameters and polyvinyltoluene spheres of 2.68 microns diameter in pure water in a suitable cell having glass walls 120 microns thick. A $TEM_{oo}$ mode beam of an argon ion laser of radius $w_o = 6.2$ microns and a wavelength $\lambda = 0.5145$ microns was focused horizontally through one of the walls into the cell. The results were observed by eye through a microscope and an eye-protecting filter. The beam was manipulated to strike single particles. When a beam of milliwatts of power hit a 2.68 micron particle off center, the particle was simultaneously drawn in toward the beam axis and accelerated in the direction of the light beam with a terminal velocity of microns per second until it hit a wall of the glass cell, where it then remained trapped in the beam. If the beam was then blocked, the particle wandered away from the trapping site by Brownian motion. Similar effects occurred with the smaller particle sizes but required more power for the same velocity.

The differences in the accelerations of the different-sized transparent particles were dramatically illustrated when they were mixed throughout the water solution and then the beam was directed to strike many of them upon its passage through the cell. The beam then preferentially accelerated 2.68 micron particles and tended to leave the 0.585 micron particles behind. This experiment illustrates the separation of particles based on optical cross section and differs from an ultracentrifuge in that its force falls more slowly with particle size. It also illustrates that radiation pressure and not convection is the driving mechanism, since convection could not separate the particles in this manner.

Figure 4:
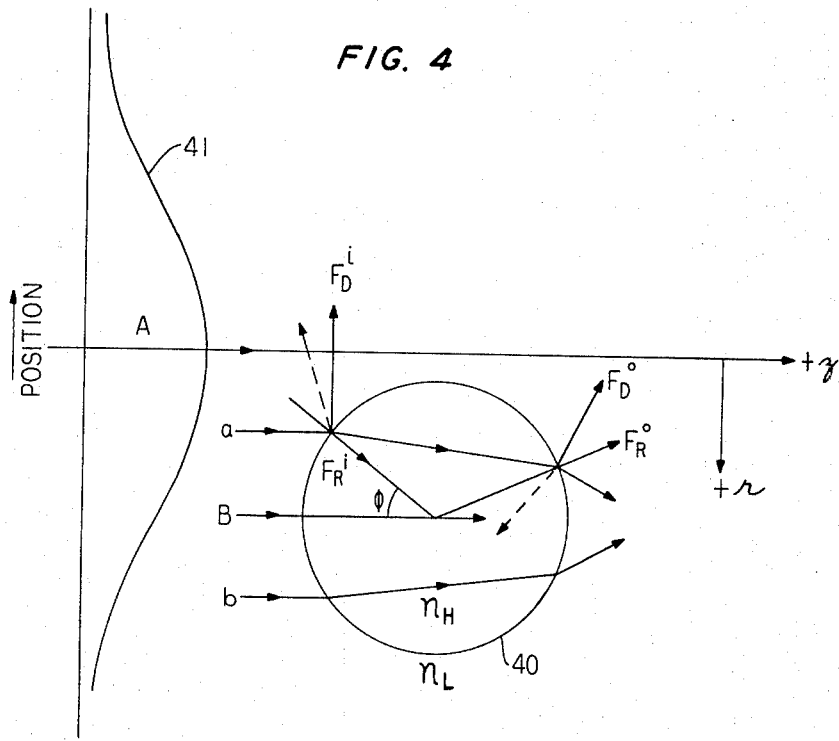
FIG. 4 shows an explanatory force diagram for a typical neutral particle controlled according to the techniques of the invention.

The particle velocities and the trapping of the particles on the beam axis can be accounted for in detail with reference to the force diagram of FIG. 4. Let us assume that the index $n_H$ of the spherical particle 40 is 1.58. The curve 41 at the left-hand side of FIG. 4 illustrates the intensity of the light beam propagating along the axis A for various cross-sectional positions within the beam indicated in the vertical direction. It will be seen that the spherical particle 40 is situated off the beam axis in water of index $n_L = 1.33$. Consider the stronger ray $a$ of a typical pair of rays, $a$ and $b$, symmetrically situated about the center of this sphere. The ray $a$ undergoes Fresnel reflection and also refraction (called a deflection here) at both the input and output surfaces of particle 40 along its propagation path. The reflections give rise to radiation pressure forces $F_R^i$ and $F_R^o$ (the input and output reflection forces). It will be noted that each of these reflection forces bisect the exterior obtuse angle between the indicated and reflected components at the respective one of the surfaces. The deflections further give rise to radiation pressure forces $F_D^i$, $F_D^o$ (the input and output deflection forces). It will be noted that each of these deflection forces bisect the exterior obtuse angle between the incident and deflected components at the respective one of the surfaces, as shown. Let us adopt cylindrical coordinates such that the direction of the beam is the $+z$ direction and the transverse coordinate is $r$, radially out from the beam axis A. Although the magnitudes of the forces due to ray $a$ vary considerably with the angle $\Phi$ (the angle between the incident direction of propagation and the sphere radius to the point of incidence), qualitatively, the results are alike for all $\Phi$. The transverse (in the coordinate $r$) components of $F_D^i$ and $F_D^o$ are much larger than $F_R^i$ and $F_R^o$. In fact, they are about ten times larger for $\Phi = 25°$. All of these forces contribute to acceleration in the direction of propagation of the beam. $F_R^i$ and $F_R^o$ have transverse components which approximately cancel, to the first order; $F_D^i$ and $F_D^o$ add in the transverse direction and are in the transverse direction toward the center of the beam, that is, toward $-r$; and the net transverse force due to ray $a$ is in the $-r$ direction. By an analogous argument, the symmetrical weaker ray $b$ gives a net force along the $+z$ direction of propagation of the beam and a net outward but weaker transverse force. Thus, this spherical particle 40 as a whole is accelerated inward and forward, as observed. Thus, we see that when $n_H$ is larger than the index $n_L$ of the surrounding medium that the net transverse (radial) force for the stronger ray is inward toward high light intensity.

The radiation-pressure force in general is given by $$F_{rad} = 2qP/c \qquad (1)$$

where $P$ is the total power of radiation striking the particle, $c$ is the velocity of light, and $q$ is the fraction of light effectively reflected back from the particle.

To compute the $z$ component of the radiation-pressure force when the particle 40 is on the axis of the beam, one integrates the incremental $z$ forces of the plane polarized beam over the surface of the sphere. This integration yields a force for which the $q$ is Equation (1) is equal to 0.062, in a typical experimental case. From this force or the $q$ value, we can derive the limiting velocity $v$, in a medium of viscosity $\eta$ by Stokes' law:

$$v = 2qPr/3c\Omega w_o^2 \eta \qquad (2)$$

where $w_o$ is the radius of the waist of the beam.

For nineteen milliwatts of power in the laser beam and a spherical particle 40 of radius 1.34 microns in water, for which $\eta$ is $1 \times 10^{-2}$ poises, I compute $v = 29\mu$/sec, whereas I measured $26 \pm 5\mu$/sec. These results show good agreement.

In the foregoing experiment, the spherical particle 40 acts as a focusing lens. A similar analysis shows that if the relative magnitudes of the indices of the media are reversed, the spherical particle becomes a diverging lens, the signs of the radial deflection forces reverse, and the spherical particle is pushed outward from the center of the beam. This prediction was checked experimentally in the extreme case of a low-index spherical particle in a high-index medium, namely, an air bubble in a high-index liquid. Bubbles, about 8 microns in diameter, were generated by shaking a high viscosity medium consisting of an 80 percent by weight mixture of glycerol in water. It was found that the bubbles were always pushed out of the light beam as they were accelerated along, as expected. In the same mixed medium having an index $n_L = 1.44$, the 2.68 micron spherical particles of index $n_H = 1.58$ still behaved in a focusing manner and were drawn inward toward the axis of the beam as they were accelerated along.

A further basic experiment involving 2.68 micron spherical particles in water in a glass-walled cell demonstrated trapping of substantially transparent particles with just two opposing beams which were shaped by lenses positioned to form the beam waists well before the trapping region, so that the beams were strongly divergent. The two beams were aligned to be approximately collinear. Particles that drifted near either beam were drawn in, accelerated to the region of substantially equal and opposite radiation pressures, were then decelerated by the counter-acceleration of the opposing beam, and eventually brought to rest by viscous damping in the region of nearly equal radiation pressures, which was a region of stable equilibrium. The stability of a particular particle in this region was checked by interrupting one beam and allowing the particle to accelerate rapidly in the remaining beam. When the opposing beam was again turned on, the particle returned to the equilibrium region more slowly than it left it in a single beam, since it was acted on only by the differential radiation-pressure force. Interrupting the other beam reversed the behavior of the particle. These particles are damped by viscous forces and have a limiting velocity in the water depending on the magnitude of the force.

In other experiments, roughly 2.5-micron-radius water droplets from an atomizer were accelerated with a single argon-ion laser beam at a power level of 50 milliwatts; and velocities of about 0.25 cm/sec were observed. Such motions could be seen with the naked eye. The behavior of the water droplets was in qualitative agreement with theoretical calculations.

In these experiments it is clear that I have discriminated against radiometric forces, particularly photophoresis. These forces push more strongly on hot surfaces and would push high-index spherical particles and bubbles out of the beam, contrary to my experimental observation that the high-index spherical particles are drawn into the beam. Even the observed direction of acceleration along the beam axis is the opposite of the radiometric prediction. According to the principles of radiometric effects, a moderately focusing sphere concentrates more heat on the downstream side (with respect to light propagation) of the spherical particle. The particle should therefore move upstream into the light (negative photophoresis). From similar theoretical considerations and calculations for water droplets in air I have confirmed that photophoresis could account for the observed results only if temperature gradients existed across each water droplet which can, in fact, not be sustained. Accordingly, my experiments demonstrate that I have successfully controlled radiometric effects and rendered them subordinate to, or less effective than, the radiation-pressure effects which I employ in my invention.

A Spectrometer Light Source

Figure 1:
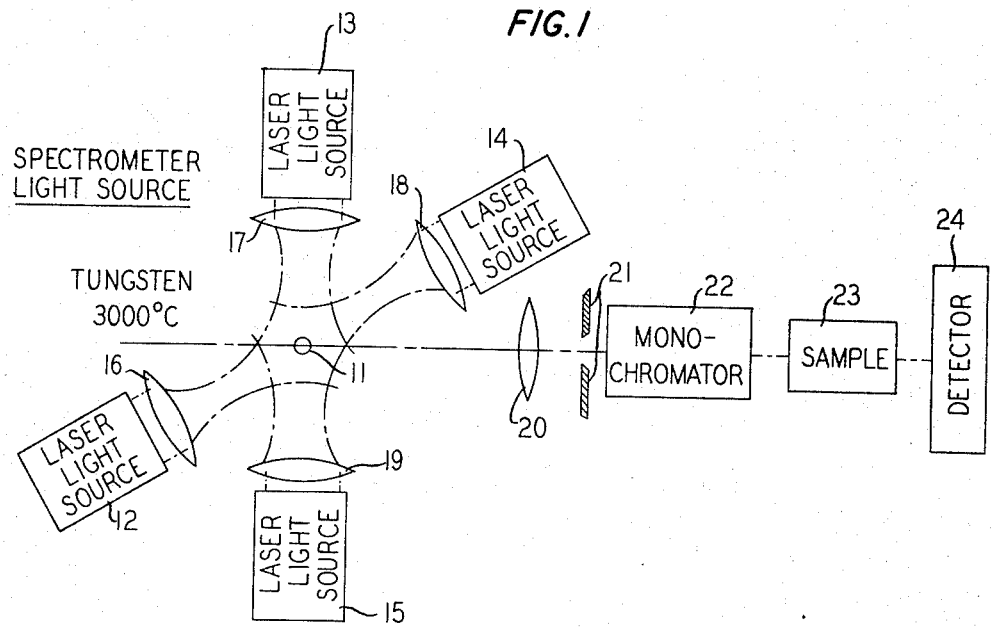
FIG. 1 is a partially pictorial and partially block-diagrammatic illustration of a first illustrative embodiment of the invention providing a new type of light source for a spectrometer.

In the embodiment of FIG. 1 a tungsten spherical particle 11 is trapped by radiation pressure in a stable optical potential well formed by the diverging intersecting beams from the tetrahedrally arranged laser sources 12, 13, 14 and 15. It is first introduced into this potential well in the presence of gas, which provides viscous damping of its motion; and then the gas is pumped out. If a regular tetrahedron were sketched around particle 11, that tetrahedron could be oriented so that each of the laser beams was orthogonal to a different one of its four surfaces. When tungsten spherical particle 11 has a diameter approximately equal to the wavelength of the continuous-wave laser light from sources 12–15, for example, at 1.06 microns, approximately 1 milliwatt of power from each of the laser sources is sufficient to heat particle 11 to a temperature near its melting point, specifically, to about 3000°C. Since particle 11 is no broader than a wavelength of the light it acts as essentially a point source of black-body radiation which extends from the far infrared through the infrared, the visible, the ultraviolet and the hard ultraviolet regions of the electromagnetic spectrum. Such a point source of light is ideal for use in a spectrometer.

More specifically, in vacuum, achieved by conventional means not shown, the particle 11 will eventually heat to the temperature at which it can be cooled by thermal radiation. At this temperature, which depends on the absorption of particle 11, a stable equilibrium of temperature will be reached and an intense, continuous, incoherent light source of the type just specified is achieved. The exact band of black-body radiation available can be controlled by controlling the excitation level of sources 12–15, by changing the angle of divergence of the beams or by changing the lenses 16, 17, 18 and 19, to place the beam waists nearer or farther from the potential well. A thin inert gas atmosphere could also be employed about particle 11, since in FIG. 1 the photophoresis forces substantially cancel.

This light source may be integrated into a spectrometer by passing a portion of the radiation from particle 11 through a collecting lens 20, a spectrometer slit device 21, a monochrometer 22, a sample 23 to be tested, and a spectrometer detector 24 arranged in tandem in that order. Illustratively, monochrometer 22 is a conventional variable monochrometer, for example, of the type employing a rotatable diffraction grating and an output slit through which a different single light frequency will pass depending on the monochrometer setting (grating angle).

In operation, the transmission of sample 23, which could be an unknown crystal, is tested throughout all of the infrared, visual and ultraviolet frequency bands in one continuous spectrum scan. Typically, the output of detector 24 during such a scan could be recorded to provide a permanent record. With respect to the operation of the light source itself, it should also be noted that the tungsten spherical particle 11 is trapped by the four intersecting beams despite the fact that it does not transmit any of the radiation and therefore does not experience several of the forces illustrated in FIG. 4. It is for this reason that a minimum of four diverging monochromatic light beams are used to form the optical potential well instead of only the two such beams which were sufficient in one of the above-described experiments with substantially transparent particles. Alternatively, two opposed beams each in a $TEM_{01}$-in-space-quadrature mode (doughnut-shaped mode) will generate forces effective to hold such a metallic particle.

The embodiment of FIG. 1 also provides a good illustration of the principle that it is merely necessary to control the thermal effects on the particle or particles subjected to radiation pressure. It is not always necessary to render the thermal effects negligible. Thus, in the embodiment of FIG. 1, the thermal effect is put to good use in providing black-body radiation, while radiation pressure is usefully employed to hold the particle 11 stable in an environment substantially free of any contamination and substantially free of disturbing convective forces.

A Neutral Particle Gun

Figure 2:
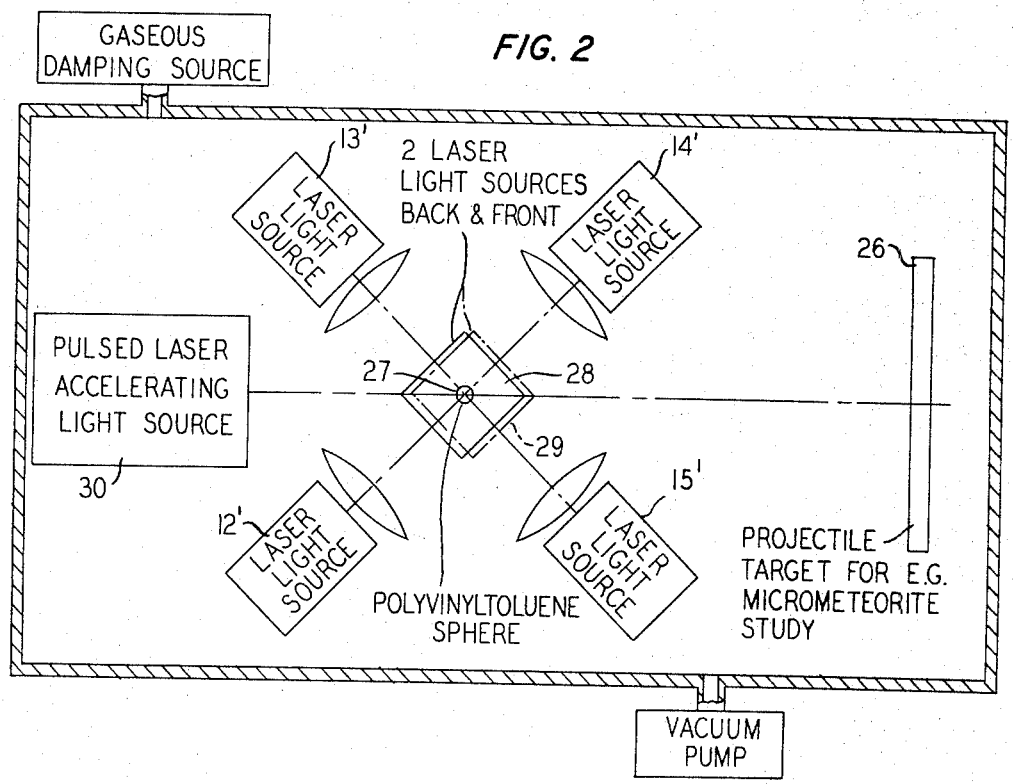
FIG. 2 is a partially pictorial and partially block-diagrammatic illustration of a second embodiment of the invention employed for a study of simulated micrometeoroids.

In the embodiment of FIG. 2, radiation pressure is employed to fire neutral particles at a projectile target 26, such as a stainless steel target which may be proposed for a space exploration machine in which it will be subjected to micrometeoroid impact. The object of this embodiment is to simulate the impact of micrometeoroids on the projectile target 26.

For this purpose, the entire apparatus of FIG. 2 would preferably be enclosed in a conventional vacuum chamber (not shown) in order to eliminate the disturbing effects of air. For the purpose of illustration, a typical polyvinyltoluene spherical particle 27, illustratively about 3 microns in diameter, of which many are introduced into the vacuum chamber, may be held by six cubically arranged diverging laser beams from sources 12' through 15', 28 and 29, the latter laser source being in front of particle 27 and, for reasons of convenience of illustration, therefore not shown. The waists of the focused beams occur before the beams reach the potential well, as in my above-described experiments. It should, of course, be clear that, if particle 27 is at least a few microns in diameter, the radiation-pressure gradients in the diverging beams are such that it can be held with only two of sources 12' through 15', 28 and 29, and that the other four could be eliminated. Preferably, each of sources 12'–15', 28 and 29 supply about 0.1 watt each of continuous-wave power at 0.5145 microns. As in FIG. 1, a gas environment is used initially to provide damping and then is pumped out. Any sort of particle, whether transparent or not, can be held in a stable optical potential well by all six of these sources.

A pulsed laser 30 is disposed along a clear line of sight extending through particle 27 toward target 26 and is pulsed to produce a strong, brief light beam when it is desired to fire particle 27 at target 26. It should be noted that the shorter the wavelength of light of source 30, the stronger is its directional control over the path of the accelerating particle 27. Nevertheless, for the purposes of illustration, I have calculated that a single pulse from a ruby laser operating at 0.6943 microns will accelerate particle 27 to a final velocity between $1 \times 10^5$ cm/sec and $1 \times 10^6$ cm/sec, which is a high micrometeorite velocity, insofar as they have been detected on earth. The high velocity particle 27 would dissipate its kinetic energy by impact with target 26; and the firing of a sufficient number of such particles in succession will provide the desired simulation of the outer space environment.

Moreover, with respect to the practical details of the portion of the embodiment of FIG. 2, it should be noted that the particles are introduced into the potential by an initial mechanism providing damping, as the gas damping technique described above.

A substantially transparent particle such as the polyvinyltoluene particle 27 can be easily constrained in a positive fashion in all three dimensions by just two bidirectional intersecting laser beams within the respective optical resonators of two lasers.

Figure 15:
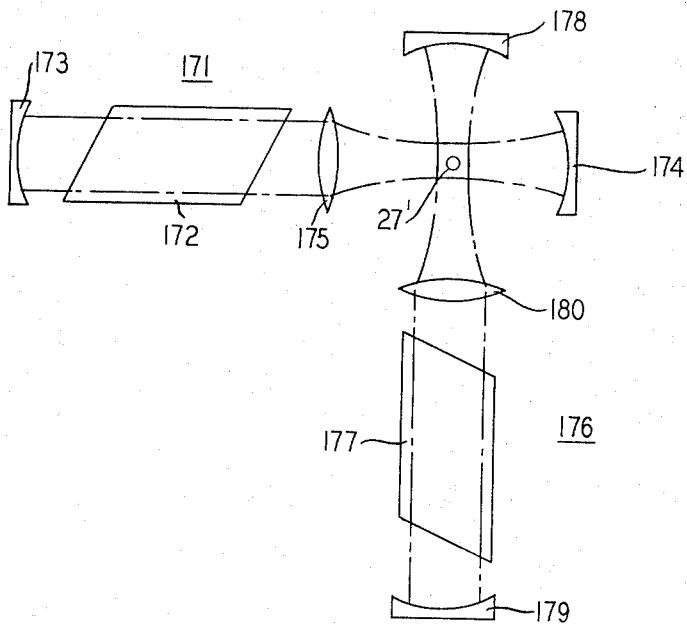
FIG. 15 shows a modification of the embodiment of FIG. 2 in which the projectile particle is held in an optical potential well internal to two laser cavities.

Such an embodiment is shown in FIG. 15. The first laser 171 includes an active medium 172 and the optical resonator including reflectors 173 and 174 and the internal focusing lens 175. The second laser 176 includes an active medium 177, an optical resonator including reflectors 178 and 179 and the internal lens 180. The lenses 175 and 180 are disposed to provide the waists of the laser beams at the mutual intersection point of the axes of the two laser resonators.

For a polyvinyltoluene particle 27', the active media 172 and 177 could be argon-ion active media appropriate for operation at $0.5145\mu$.

The embodiment of FIG. 15 operates to trap the particle 27' in an optical potential well by means of a centering effect upon such a particle 27' of Gaussian laser beams traveling in opposed directions. It will be recalled from the description of FIG. 4, and it is even more generally true, that the centering effect on a particle of relatively high refractive index occurs because of the transverse gradient of radiation pressure. When such a particle is away from the point of maximum radiation pressure forces it experiences an unbalanced force, moving it toward the center of the Gaussian beam. The particle is not accelerated in any direction in the internal beams of the lasers 171 and 176 because the intensity of laser radiation pressure along any axis through the point of intersection of the laser axes is the same in both directions along such axis. For any one such bidirectional laser beam the centering forces are applicable in two orthogonal dimensions transverse to the direction of the laser beam. Therefore, the arrangement of FIG. 15 has some redundancy with respect to the centering in a direction orthogonal to both laser beams. However, the stronger centering in this dimension is not a drawback for practical applications.

As in the preceding embodiments, the particle 27' is introduced to the optical potential well with the aid of a damping mechanism such as gas pressure damping, after which the gas is removed.

If it is then desired to fire particle 27' out of the optical potential well, as in the embodiment of FIG. 2, the direction of unbalanced radiation pressure can be chosen so that the path of the particle avoids physical obstruction by the optical resonators; or an appropriate hole can be provided in one of the reflectors.

In the latter instance, small perturbing light pulses introduced through one of the end reflectors to strike particle 27' can produce phase modulation of the laser along the axis of which the perturbing radiation is aligned and amplitude modulation of the orthogonally disposed laser, both modulations being produced by motion of the particle 27'.

High Energy Neutral Particle Accelerator

Figure 3:
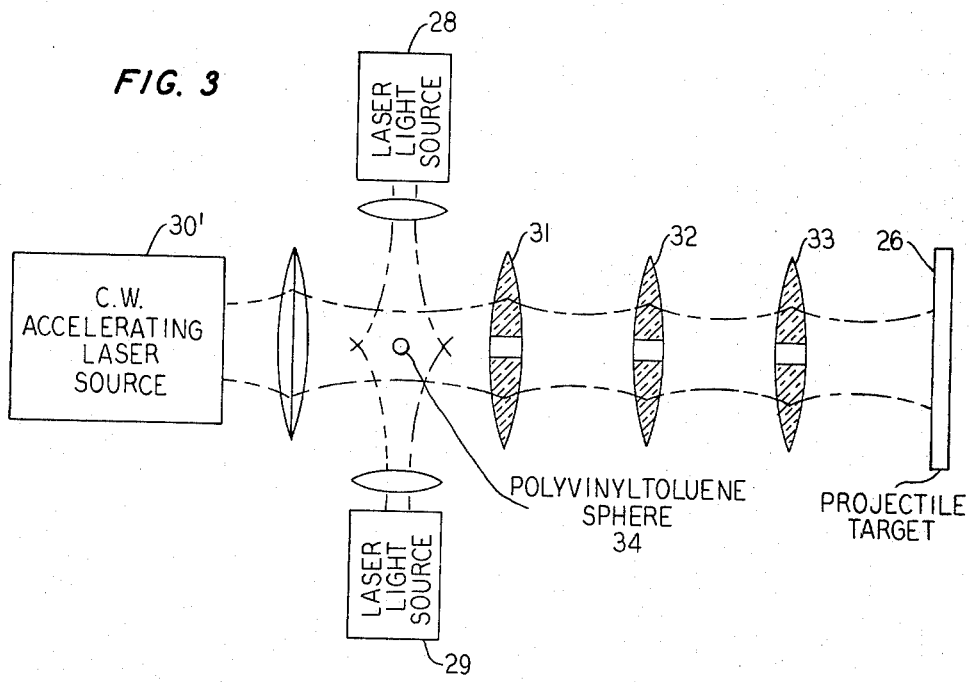
FIG. 3 is a partially pictorial and partially block-diagrammatic illustration of a high-energy acceleration embodiment of the invention.

The principles of the embodiment of FIG. 2 can be extended to what I term multiple-stage acceleration by employing, in FIG. 3, an accelerating laser source 30' which is essentially continuous-wave from the starting time of its operation or at least provides a sufficiently long optical pulse. The resulting accelerating light beam is then periodically refocused by the apertured lenses 31, 32 and 33 to provide a three-stage accelerating effect upon the neutral particle such as the illustrative polyvinyltoluene sphere 34. Sphere 34 is illustratively held in stable equilibrium before turn-on of source 30' by the continuous-wave laser light sources 28 and 29, which, as in the embodiment of FIG. 2, may be argon-ion lasers operating at 0.5145 microns at levels of about 0.1 watt each.

The operation of the embodiment of FIG. 3 should produce neutral particle velocities of the order of $1 \times 10^7$ cm/sec, which is comparable with that presently known for micrometeorite or micrometeoroid particles.

Figure 14:
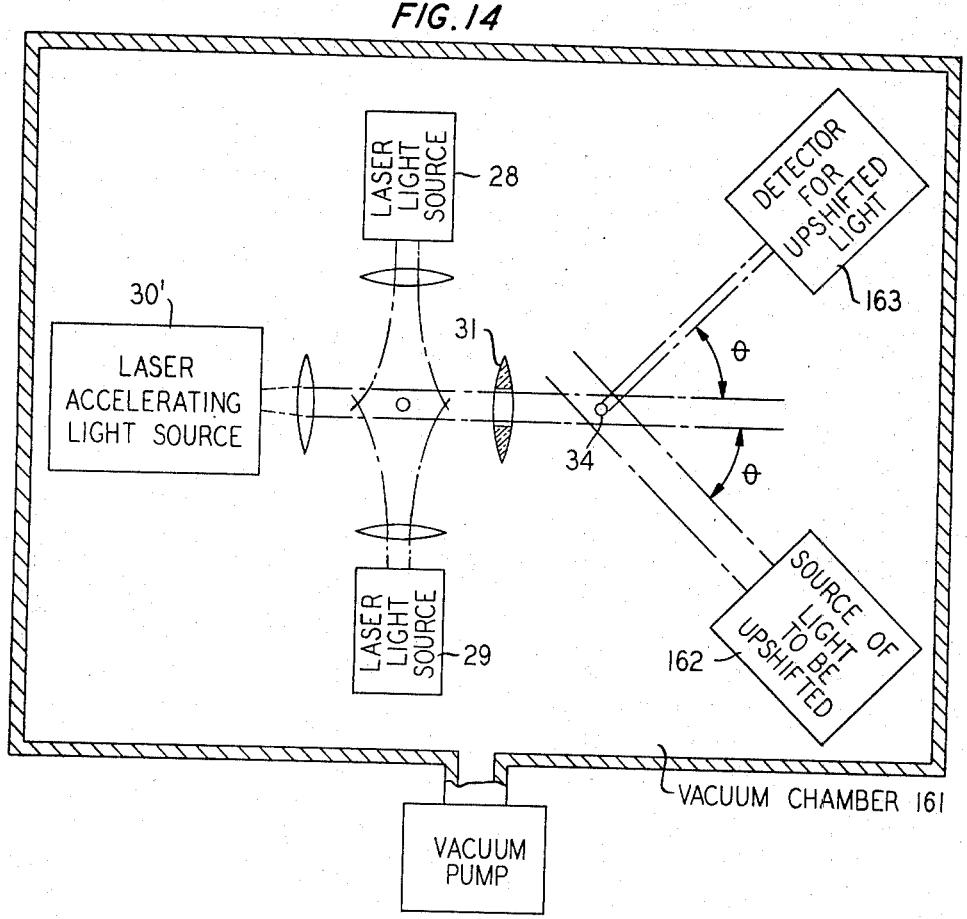
FIG. 14 shows a modification of the embodiment of FIG. 3 to provide an output of light shifted upward in frequency.

It should be noted by way of extension of the principles of the embodiment of FIG. 3 that a reflective particle, or a particle having one flat surface accelerated to the velocities mentioned above, can produce a useful Doppler-shift in the frequency of light which can be reflected from such a particle at some point along its flight path. Such a modified embodiment is illustrated in FIG. 14. The particle 34 is held by the same arrangement as in the embodiment of FIG. 3 and is accelerated by the source 30' as in the embodiment of FIG. 3. After the particle 34 has reached a velocity of the order of $10^7$ centimeters per second, coherent light from a laser source 162 is directed obliquely to the path of particle 34 at an angle $\theta$. Light reflected from the particle at angle $-\theta$ with respect to the particle path and Doppler-shifted upward in frequency is received by a detector 163. If the particle 34 is still accelerating at this point and if the laser beam from source 162 is broad enough and the detector aperture of detector 163 is large enough, then the detected light will be "chirped" in frequency.

It should be noted that radiation-pressure forces are sensitive not only to particle size but to particle shape. In brief, radiation-pressure will exert essentially a "-weathervane effect" on elongated particles, such that the long dimension will be aligned along the direction of the radiation-pressure force, providing that oscillatory energy is removed from the particles. Such an orientation of particles, which can be made stable and nonoscillatory with the aid of very weak gaseous viscous damping, may be very useful in the acceleration of a particle such as particle 34 in the modified embodiment of FIG. 14. For example, the side of the particle from which the light is reflected and Doppler-shifted could be made flat for greater reflection efficiency. This flat side would be orthogonal to the direction of particle elongation.

It is clear that the degree of damping provided would limit the maximum particle velocity. Therefore, an undamped, spherical particle accelerated in vacuum would be preferable if the highest possible particle velocity is desired.

Strong-Focusing Accelerator

The principles of the embodiment of FIG. 3 are extended further in FIG. 5 in order to accelerate a dielectric neutral particle 51 which is either too small or insufficiently transmissive of the accelerating laser light to be held by radiation-pressure gradients producing the forces of FIG. 4. Indeed, the particle 51 can be an atom or a molecule if it is appropriately selected or, equivalently, the frequencies of the trapping and accelerating laser beams are appropriately chosen.

By way of general background on this point, it should be noted that the extension of the principles of my invention to accelerate or trap atoms or molecules opens many new possibilities. Although, in general, atoms and molecules are quite transparent to light, the successful application of my invention in this instance depends upon resonance interaction of the atom or molecule with the light. Thus, I employ laser light sources 52 and 53 which are tuned to a particular resonance radiation transition of the particle 51, so that the interaction cross section becomes dramatically greater than the geometric cross section. For example, an atom of sodium has a geometric cross section $\pi r^2$ of $1.1 \times 10$ square centimeters; whereas, from the absorption coefficient, the cross section $\sigma_T$ at temperature T for the $D_2$ resonance line at $\lambda = 0.5890\mu$ is $1.6 \times 10^{-9}$ cm$^2$, or about half of the wavelength squared for a temperature less than 40°K, which is in the region of negligible Doppler-broadening. The absorption and isotropic reradiation by spontaneous emission of resonance radiation in response to such radiation striking an atom results in an average driving force in the direction of the incident light.

For the purposes of the embodiment of FIG. 5, it is sufficient to say that substantial accelerations can be generated because of the enlarged cross section of the atom or molecule for interaction with resonance radiation. Nevertheless, the particle is so small that the force diagram of FIG. 4 is inapplicable in that no gradient of radiation pressure is apparent to the tiny particle and no inherent centering or focusing forces are exerted by the accelerating laser beam whether or not it is diverging. For this reason the pulsed laser source 54 can be employed merely to start the acceleration of particle atom or molecule 51; and its further acceleration as well as recentering can be provided by the oblique radiation-pressure forces supplied by unidirectional laser beams in ring lasers 55, 56, 57 and 58 along the path of the accelerated particle toward the ultimate target 59. It should be noted that ring lasers are not necessary and that all the desired beams could be supplied from the output of one laser by beam-dividers and mirrors. The ring lasers 55–58 are mutually rotated about the acceleration axis so that the net resultant of the transverse radiation-pressure accelerations of their unidirectional beams cancel. Yet at each oblique intersection of one of these beams with the accelerating particle 51 the particle 51 receives a further forward kick; that is, a further acceleration toward the target 59. The net result of the rotating transverse forces of the oblique ring laser beams which are also in resonance with a transition of the particle 51, is to confine the particle 51 to propagation along the desired path of acceleration in a helix or spiral. This lateral confinement is quite analogous to electronic or optical strong-focusing arrangements. The physical effect in this case, of course, is a combination of neutral atomic and optical interactions and is neither purely optical nor purely electronic in the sense of the prior strong-focusing art.

The apparatus of FIG. 5 can also provide a curved path of the particle 51 by gradually angularly shifting the orientations of the light beam paths. Specifically, a circular path can be obtained. The circular path can be reduced in size by providing charge on each particle 51 or a magnetic moment for each particle 51 and then supplementing the technique of FIG. 5 with well-known techniques of electric or magnetic focusing.

Molecular Gas-Phase Isotope Separation Apparatus

The principles of the above-described radiation-pressure interaction with atoms and molecules at resonance can provide a true optical gas pump which can operate against significant gas pressures and which can outperform the most modern ultracentrifuge and diffusion techniques for isotope separation that are now known in the art. Such an isotope separation apparatus, which could also be called more generally a gas pump, is shown in FIG. 6.

In this instance I have shown the configuration of the vacuum chamber because its shape contributes to the success of containment of the isotope selected for confinement to a source region 61 of the vacuum chamber 60. A source mixture 62 of two molecular gases including different isotopes of the same element, for example, carbon or hydrogen isotopes in two species of $CH_3F$ are originally confined to the region 61, for example, by a valve (not shown) across the first neck region 63 which may easily be opened when laser source 64 is turned on. In succeeding wide regions of the vacuum chamber 60, that is, regions 65, 66, 67 and 68, the lenses 65' through 68' are disposed to focus the resonance radiation beam from source 64 so that it substantially fills the neck regions between those wide regions. The frequency of light from source 64 is selected to interact with a resonance radiation transition of the carbon or hydrogen molecules of one isotope, e.g., $C^{13}$, which differs in frequency from the comparable transition of the other isotope, e.g., $C^{12}$. It should be noted that the magnitude of the difference of these frequencies is typically accentuated by the presence of the isotopes within molecules. For example, the source 64 could be a carbon dioxide laser operating at about 9.6 microns. With a tunable laser in this region of the spectrum, several of the rotational levels of the selected species of $CH_3F$ can be pumped simultaneously for increased efficiency. After a period of operation, all of the molecules of one species will still be confined to region 61; while the molecules of the other species will have diffused through the beam and around the lenses to be evacuated by vacuum pump 69. Similarly, hydrogen isotopes including ordinary hydrogen, deuterium or tritium could be separated in this embodiment, using $CH_3F$ and a 9.6 micron $CO_2$ laser or a tunable laser in this region of the spectrum.

To shorten the lifetime of the upper states of the resonance radiation transitions by collisions with walls without introducing a buffer gas, a multiple-channeled metallic structure (not shown) may be disposed in the neck region preceding region 61. This structure is arranged to pass most of the light beam. See the article "Molecular-Beam Sources Fabricated from Multichannel Arrays, I. Angular Distributions and Peaking Factors," by R. H. Jones et al., at page 4641, Journal of Applied Physics, Vol. 40, No. 11, Oct. 1969, for details of such multiple-channeled metallic structures.

As a further instructive example on the use of such an apparatus as a gas pump, all of the regions of chamber 60 are initially filled with sodium vapor at $T = 510°K$, for which the initial pressure, $p_o$, is $10^{-3}$ Torr ($3.4 \times 10^{13}$ atoms per cubic centimeter) and a helium buffer gas at 30 Torr. A transparent pump tube of length $l = 20$ centimeters with a diameter $2w_o = 10^{-2}$ cm is uniformly flooded with laser light tuned to the $D_2$ line of sodium from the left. Now, first consider a simpler case with low total optical power P, low Na pressure and no buffer gas. Light depletion and saturation can then be neglected. Most atoms are in the ground state. The average force on an atom is $P\sigma_T/c\Omega w_o^2$ and is substantially constant along the pump light beam. Call $X_{cr}$ the critical distance. It is the distance traveled by an atom in losing its average kinetic energy $\tfrac{1}{2}mv_{av}^2$. That is $Fx_{cr} = \tfrac{1}{2}mv_{av}^2 \cong kT$. The variation of pressure in a gas with a constant force is exponential. Thus $$p(x) = p_o e^{-Fx/kT} = p_o e^{-x/x_{cr}} \quad (3)$$

$$x_{cr} = \Omega w_o^2 ckT/P\sigma_T \quad (4)$$

Next, consider higher power and higher pressure of Na. Saturation sets in. Population equalization occurs between upper and lower levels for those atoms of the Doppler-broadened line of width $\Delta\nu_D$, within the natural line width $\Delta\nu_N$ of line center. That is, a "hole" is burned in the absorption line and the power penetrates more deeply into the tube. There is a net absorption even when saturated due to the ever present spontaneous emission from the upper energy level. The average force per atom also saturates and is constant along the tube, except for power broadening, which increases the net pumping effect, at substantially increased power levels. The saturated force value is $(h/\tau_N\Delta)(\Delta_{Nl}\Delta_D)$ where $\tau_N$ is the upper level natural lifetime.

Lastly, the effect of the buffer gas is to introduce collision broadening. With collisions one replaces $1/\tau_N$ by $(1/\tau_N + 1/\tau_L)$ and $\Delta\nu_N$ by $(\Delta\nu_N + \tau\nu_L)$ in the average saturated force where $\Delta\nu_L + \tfrac{1}{2}\pi\tau_L$ is the Lorentz width. Then $$x_{cr} = kT\lambda/n \, (\tau_N\tau_L/\tau_N=\tau_L) \, (\Delta\nu_{Dl}\Delta\nu_N=\Delta\nu_L) \quad (5)$$

For the initial and helium pressures given above, for $\tau_N = 1.48 \times 10^{-8}$ sec and $\tau\nu_D = 155\tau\nu_N$ (at $T = 510°K$) and $\Delta\nu_L \cong_{30} \Delta\nu_N$, one finds $x_{cr} = 1.5$ cm and $l = 20$ cm $= 13.3 \, x_{cr}$.

Thus $p(l) = 2p_o e^{-13.3} = 2 \times 10^{-3} \times 1.7 \times 10^{-6} = 3.4 \times 10^{-9}$ Torr. Essentially complete separation has occurred. This requires a total number of photons/sec $= 2\pi w_o^2 x_{cr} \, n_o/(1/\tau_N = 1/\tau_L) = 1.7 = 10^{19}$ photons per second, which is about 6 watts. Under saturated conditions there is little radiation trapping of the scattered light. Essentially all the incident energy leaves the gas without generating heat. The technique applies for any combination of gases. Even different isotopes of the same atom could be separated due to the isotope shift of the resonance lines.

The buffer gas effectively reduces the lifetime of the upper level of the resonance radiation transition of the sodium and results in a greatly enhanced average force per atom.

Isotope separation by radiation pressure is also possible when the isotopes are in atomic form as well as when they are combined in the molecular form, such as the hydrocarbon form described above. A good example of the possibility of isotope separation of atomic species is provided by the isotopes of potassium, $K^{39}$ and $K^{41}$; specifically the common isotope $K^{39}$ has resonance radiation lines at $0.7699\mu$ and $0.7665\mu$, either of which is usable for the purpose, that is, coherent light at one of those wavelengths would be supplied in an apparatus such as the apparatus of FIG. 6 to hold the common isotope species in the region 61 of the supporting mixture while the rarer isotope $K^{41}$ because of a frequency shift of its corresponding resonance radiation line, would escape from the region 61 and be collected at vacuum pump 69 or immediately before pump 69. The typical shift of such resonance radiation lines for $K^{39}$ and $K^{41}$ would typically be of the order of a few gigahertz. This shift in the resonance radiation line is sufficient to greatly reduce the radiation-pressure force on the rarer isotope. For implementing such an embodiment it is clearly highly desirable that a tunable coherent optical source is used to generate the desired wavelength of coherent light. For this purpose, a tunable parametric oscillator employing an active crystal of barium sodium niobate pumped by an argon ion laser at 0.5156 would be typical. If continuous-wave oscillation is not feasible, rapid pulsing may be sufficient.

Figure 13:
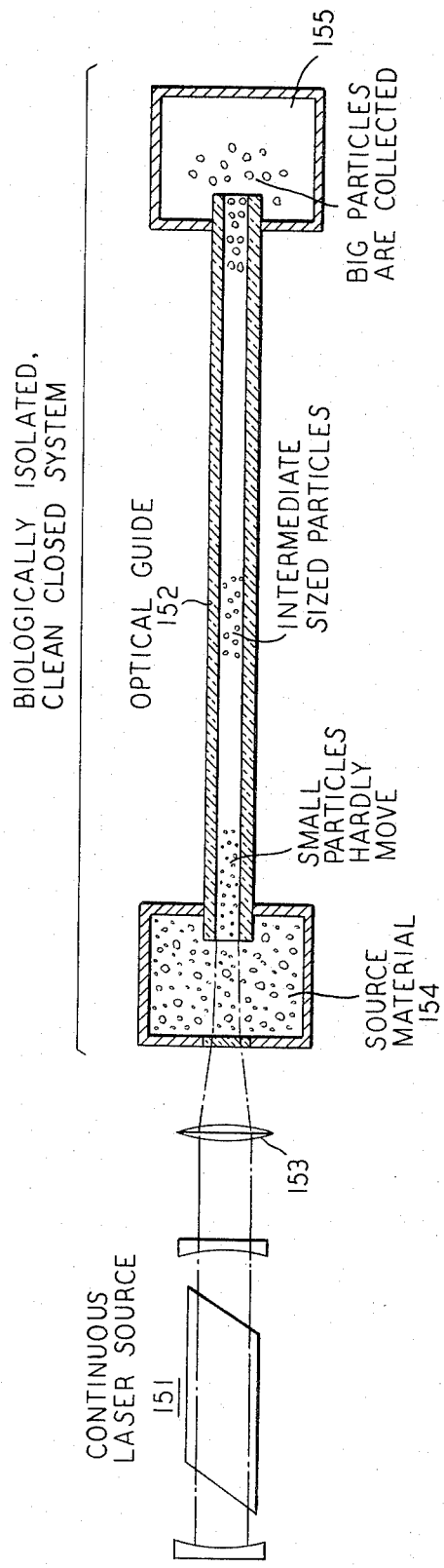
FIG. 13 shows a modification of the embodiment of FIG. 6 for separating macromolecules, viruses and other particles which have heretofore been separated by ultracentrifuge techniques.

A further extension of the principles of the embodiment of FIG. 6 is shown in the embodiment of FIG. 13. Here a continuous-wave laser source 151, which could nevertheless be a repetitively pulsed laser, is focused into a glass walled optical guide 152 by a lens 153 and carries with it macromolecules or viruses from the source material 154 disposed at the entrance of guide 152. The smaller particles, viruses or molecules, will hardly move along guide 152; the intermediate size particles will migrate farther down guide 152. The largest particles and macromolecules will succeed in migrating into the collecting chamber 155. It will be noted that the liquid in which the particles are supported will fill guide 152 and will typically have a substantially higher refractive index than the glass walls of guide 152 in order to guide the coherent laser light and thus confine its radiation pressure largely to the desired region.

The performance of the embodiment of FIG. 15 in separating macromolecules, viruses and other large particles from smaller particles is calculated to be capable of greatly exceeding that of the most modern ultracentrifuge.

It should be particularly noted that the embodiment of FIG. 13 does not depend on resonance radiation interactions with the particles that are moved, although resonance radiation interactions with such particles could be used. By tuning the coherent light source to resonance, even atoms and ions in a liquid could be selectively moved through the liquid by the radiation pressure of applied resonance radiation.

A New Laser Source

The dramatic increase in cross section of an atom for a resonant interaction with a laser beam of photon energy matched to a transition of the atom makes feasible the use of radiation pressure to facilitate population inversion in relatively short-wave length gaseous systems.

Such a system is shown in FIG. 7. A reservoir 17 for a gaseous medium 72, which has short-wave length transitions substantially above the ground state, is joined to a vacuum chamber 73, which is evacuated by a vacuum pump 74.

The gaseous medium 72 is excited by a direct-current discharge from an electrical source 75 connected between an anode 76 and a cathode 77 at opposite ends of reservoir 71. Alternatively, thermal, chemical or other means can be used to generate a high temperature in medium 72 in reservoir 71 without necessarily producing any population inversion.

To facilitate a population inversion in medium 72, radiation-pressure pumping of the noninverted-population portion (ground state portion) of medium 72 is provided by the continuous-wave laser source 78, illustratively a laser tuned to important transitions (resonance radiation transitions) from the ground state. The beam from source 78 is focused by lens 79 so that it effectively fills the cross-sectional area of the necked-region 73a of vacuum-chamber 73.

The inverted population portion of medium 72 does not experience resonant interaction with the beam from source 78 and diffuses outward toward lens 79. At an optimal axial position in terms of the density of the inverted states and their expected lifetime, an optical resonator is disposed transversely of region 73a. Only the back reflector 80 of this resonator is shown, for reasons of convenient illustration. The front reflector (not shown) may be made partially transmissive so that a useful high-power output beam is extracted in a direction which is out of the plane of the paper in FIG. 7. It is suggested that population inversions at relatively short wavelengths, such as ultraviolet wavelengths, can be achieved in this way.

The spent molecules will either be pumped back into reservoir 71 by radiation pressure or removed by vacuum pump 74. A few spent molecules may be re-excited to the upper laser level by source 78 while still within the resonator and again become part of the inverted population there.

Vacuum Deposition Assisted by Radiation Pressure

The vacuum deposition apparatus shown in FIG. 8 is an extension of the controlled heating employed in the embodiment of FIG. 1. While in FIG. 1 the controlled heating of a slightly absorbing particle in an optical potential well provided an intense black-body (3000°C) light source, in the embodiment of FIG. 8 the particle 81 in the potential well formed by diverging beams from laser sources 82 and 83 is vaporized by a pulsed increase in power from lasers 82 and 83. In any event, the power increase should be symmetrical to prevent particle motion. The entire assembly is disposed in a liquid-helium-cooled vacuum chamber 86 which is evacuated by a vacuum pump 87.

Illustratively, workpiece 85 could be an ultrapure piece of silicon (Si) on which a very thin silicon monoxide (SiO) layer is to be deposited. The lasers 82 and 83 could be any lasers providing substantially monochromatic light to which particle 81 is substantially transparent but slightly absorbing, e.g., 1.06 microns from a neodymium-ion (yttrium aluminum garnet host) laser. The vapor molecules and particles will tend to spread to cover workpiece 85 with a thin film 88 which will be ultrapure, since it has had no contact with a contaminating vessel during the vaporization process. Indeed, there will be no deleterious out-gassing from the walls of chamber 86 since they are held at liquid-helium temperature.

RADIATION-PRESSURE-ASSISTED TENSILE STRENGTH TESTING

Frictionless motion of a small spherical body of material in vacuum in a stable optical potential well formed by radiation pressure is of interest for many applications, for which the tensile-strength testing apparatus of FIG. 9 is illustrative.

In the embodiment of FIG. 9 the vacuum chamber 91 is evacuated to a high degree of vacuum by vacuum pump 92. Disposed within vacuum chamber 91 are the circularly polarized laser sources 93 and 94, which are used in part to form the stable optical potential well in cooperation with the lenses 95 and 96, respectively. The diverging beams intersect beyond their waists and overlap in a central region in which the stable optical potential well is formed.

Into that region is introduced, illustratively by techniques described above, a spherical body 96 of material which is to be tensile-strength tested.

Although the body 97 is illustratively a substantially transparent and only slightly absorbing material, such as quartz ($SiO_2$) or silicon (Si) which is to be tensile-strength tested, it could also be a highly reflective and slightly absorbing material, provided other lasers, not circularly polarized, are cubically arranged with lasers 93 and 94 to form the optical potential well.

The key to this embodiment is uniform angular acceleration of body 97 based on optical absorption of circularly polarized light, where the torques from the circularly polarized radiation from sources 93 and 94 are additive. A photon has angular momentum; in circularly polarized light all of the angular momenta have the same sense. Adsorption of the photons transfers the angular momenta. It will be noted that the light from source 93 is left-hand circularly polarized, and the light from source 94 is right-hand circularly polarized. The body 97 will spin away from the viewer at the top and toward the viewer at the bottom. Illustratively, the power of the sources forming the optical potential well is kept low enough that destruction by tensile failure occurs before vaporization of body 97. The angular velocity at failure will be directly related to the tensile strength of body 97, all other factors being equal, in view of the fact that the tensile forces within body 97 are centrifugal forces which are directly related to its angular velocity. The angular velocity can be measured by the Doppler shift of light scattered from the body 97 in response to obliquely incident light.

This technique also provides a very sensitive measurement of absorption, since the angular velocity of body 97 is proportional to the time integral of the absorption.

Accordingly, I suggest the use of the embodiment of FIG. 9 to measure very low optical absorptions. Measurement of the angular velocity would be completed before tensile failure. In fact, absorptions so low that days elapsed to accelerate the particle could be measured extremely accurately.

Neutral Gas Trapping

In much basic molecular physical research it would be desirable to have a highly pure gas sample confined in a small region in vacuum, where it would be free of any spurious contamination and still would be accessible as a target for bombardment by high or low energy particles from conventional accelerators or those described above.

Figure 10:
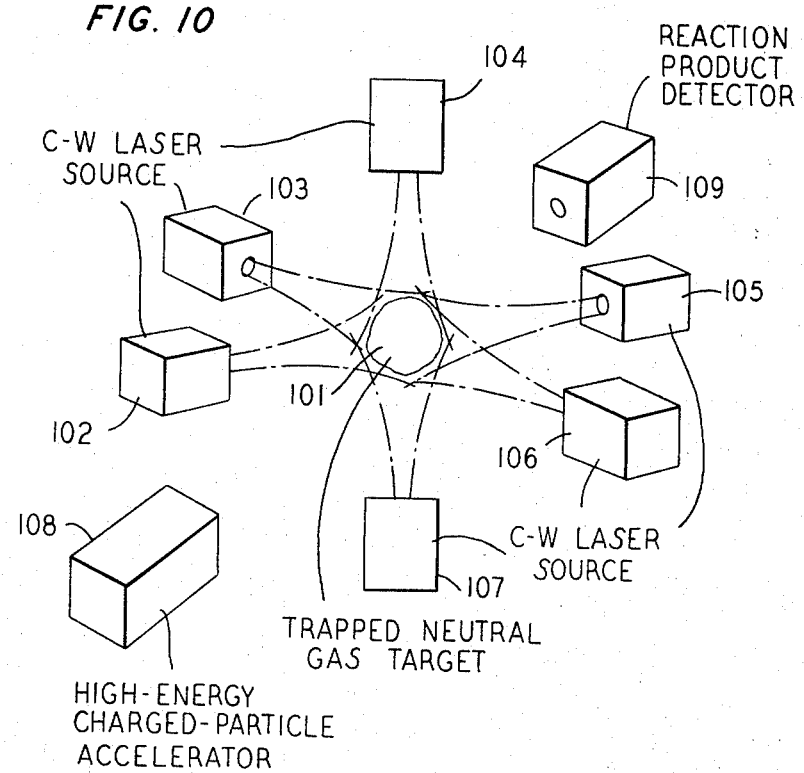
FIG. 10 is a partially pictorial and partially block-diagrammatic illustration of an embodiment of my invention for trapping a body of neutral gas free of container contamination.

In the embodiment of FIG. 10, a gas trapping apparatus is shown without showing the related vacuum apparatus, since this would complicate the drawing. The trapped neutral gas body or target 101 is held in a stable optical potential well by six continuous-wave, substantially monochromatic incoherent laser sources 102, 103, 104, 105, 106 and 107. A particle from the accelerator 108 of conventional prior art type is directed toward the neutral gas target 101. The resulting radiation decay products will tend to propagate in the direction of the extended flight path of the charged particle from accelerator 108. These reaction products are detected by suitably disposed detectors such as the reaction product detector 109.

Radiation-Pressure Molecular Beam Displacement and Separation

Figure 11:
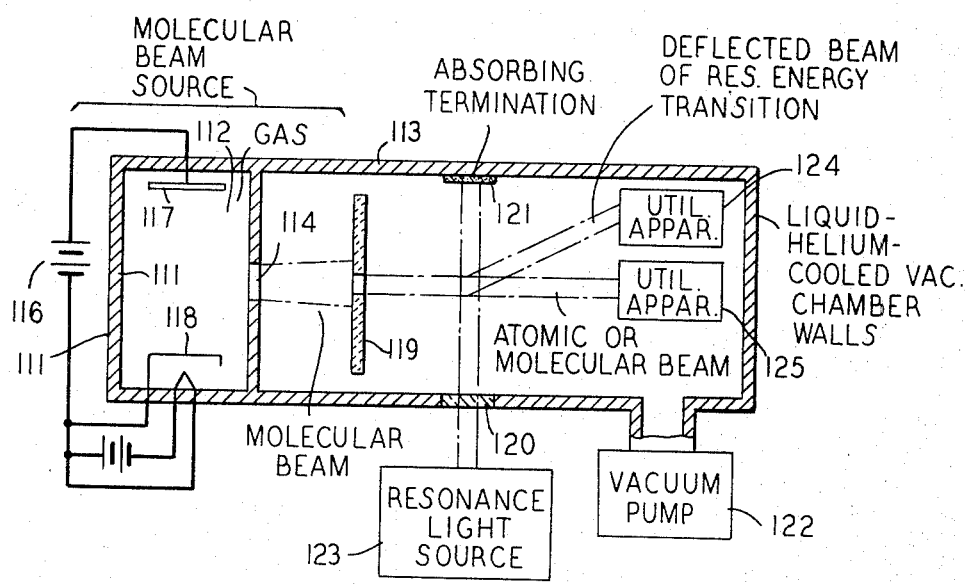
FIG. 11 is a partially pictorial and partially block-diagrammatic illustration of a molecular beam separation and deflection apparatus employing my invention.

FIG. 11 illustrates an application of the invention which has been alluded to several times above but which is so useful for molecular beam masers, basic physical research and other purposes that the specific embodiment of FIG. 11 is shown.

In this embodiment the deflection of a component of a molecular beam, or one of several molecular beams propagating collinearly, is based upon the large resonant cross section of a coherent light beam for a particular species of particle within the molecular beam or beams.

Thus, a molecular beam source is provided by a reservoir 111 holding a molecular gas 112. The reservoir 111 is coupled to a vacuum chamber 113 through an aperture 114 in a side wall of reservoir 111.

To provide a plurality of the excited species in the molecular beam 115 which issues from reservoir 111, the gas 112 is subjected to an electrical discharge from an electrical source 116 connected between anode 117 and cathode 118 within reservoir 111, or is otherwise heated. The molecular beam 115 is further collimated by the slit apparatus 119 and passes between the transparent window 120 in one wall of vacuum chamber 113 and an absorbing termination 121 on the opposite wall of vacuum chamber 113. Light from a narrow band laser source 123, for which termination 121 is absorbing, is supplied through window 120 to interact resonantly with one species of particle in the molecular beam, illustratively those particles in the lowest state of an optical transition having a photon energy equal to the photon energy of laser source 123. Such particles which absorb and irradiate the laser light experience a net acceleration which carries them toward the utilization apparatus 124. Their optical final state on arrival at utilization apparatus 124 depends upon the transit time between their point of deflection and their arrival at apparatus 124. That time can be selected so that they arrive in the lower state of the aforesaid optical transition. Similarly, the transit time to a second utilization apparatus 125 for the remainder, the undeflected portion, of the beam can be selected so that all particles in that portion arrive at apparatus 125 in the upper state of the optical transition.

Thus, if the lower state were the upper level of a microwave laser transition, apparatus 124 could be a microwave maser of the molecular beam type. Similarly, apparatus 125 could be a laser that produces light of the same wavelength as source 123 but which is nonetheless unusual in employing an active medium that is a well-defined molecular beam.

RADIATION-PRESSURE ACCELEROMETER FOR INERTIAL GUIDANCE OR LOW GAS PRESSURE MEASUREMENTS

Figure 12:
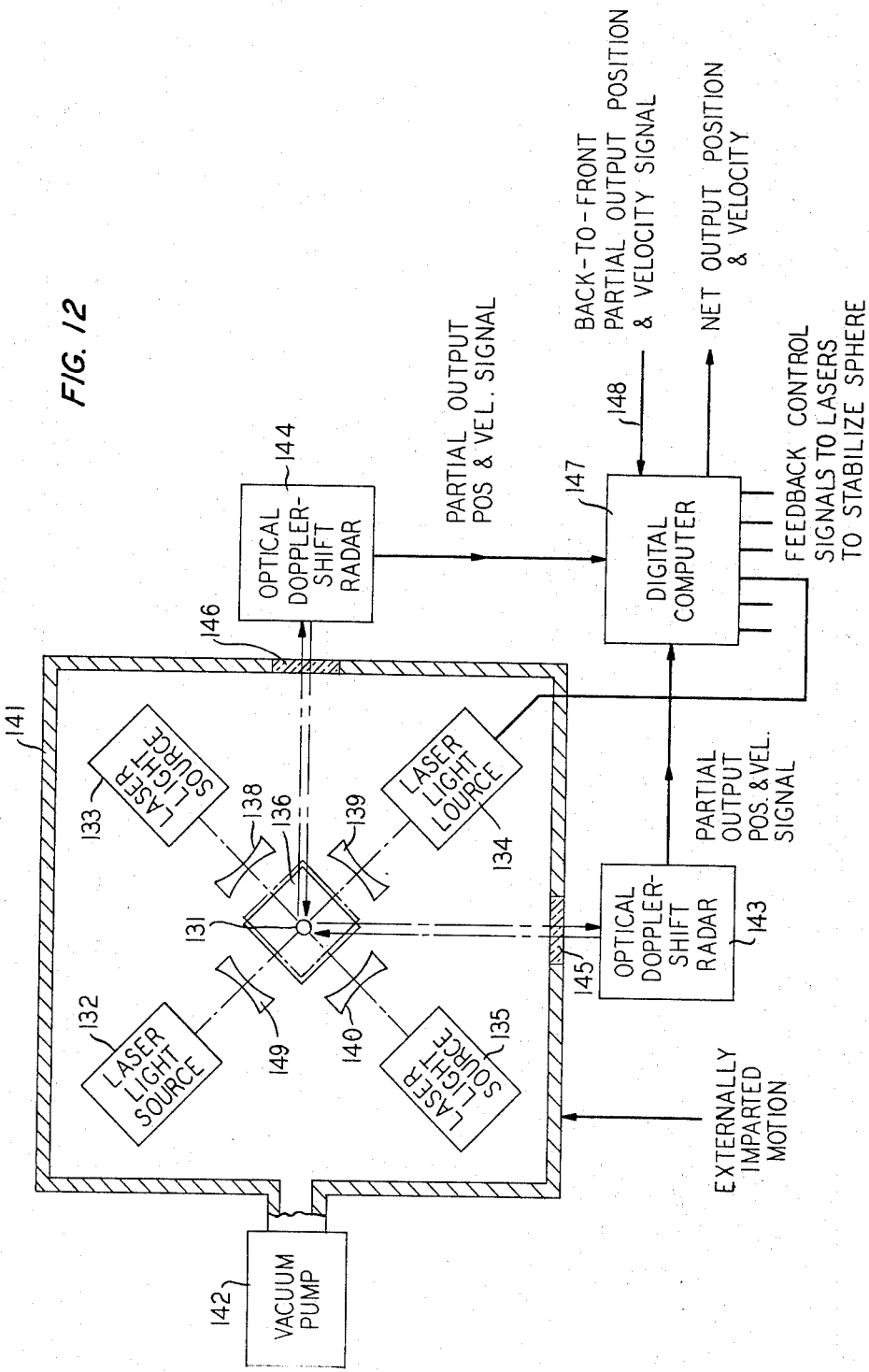
FIG. 12 shows a modification of the embodiment of FIG. 2 useful as an accelerometer or to measure gas pressures.

In the embodiment of FIG. 12, use is made of the extreme sensitivity of small particles in optical potential wells to small perturbations. In the embodiment of FIG. 12, a highly transparent body 131 of low loss, high quality optical quartz measuring about 3 microns in diameter is suspended in an optical potential well which is formed by six laser light sources 132, 133, 134, 135, 136 (in back) and 137 (in front and not shown). The laser beams are all shaped to be substantially diverging by suitable lenses such as lenses 149, 138, 139 and 140, the two other lenses not being shown.

It will be noted that this optical potential well is highly redundant as is desirable for control purposes, to be described hereinafter. A sufficient optical potential well for the transparent particle 131 could be formed by just two such sources arranged to be opposed along the same axis. The entire apparatus thus far described is enclosed in a vacuum chamber 141 evacuated by a vacuum pump 142.

Optical radar signals are directed at particle 131 from three external sources of which two, 143 and 144, are shown. The coherent light from these radars is directed through suitable windows 145 and 146 of vacuum chamber 141. The back-reflected light from particle 131 is received by the radars 143 and 144 and employed to produce a signal, based on Doppler shift, which indicates in an implicit form, the position and velocity of particle 131 in one coordinate along the axis of that radar. Three such Doppler-shift signals are applied to a digital computer 147 of conventional type. These signals include the signal for the motion of particle 131 into and out of the plane of the paper. This signal is indicated by the arrow 148. From these input signals the digital computer produces a net output position and velocity for the frame of reference in which particle 131 is disposed. Such an output signal is of the type desired from an accelerometer used in inertial guidance systems. In addition, the digital computer 147 produces six output signals which control the intensities of the lasers 132 through 137 to increase the forces tending to restore particle 131 to its equilibrium position. It is by such restoring forces, keeping particle 131 near its central position, that the highest accuracy will be obtained. It should also be noted that digital computer 147 can be readily programmed to compensate for the undamped (or slowly damped) components of motion of particle 131 or power fluctuations of the trapping beams.

A further embodiment of the invention essentially the same in appearance as that of FIG. 12 would employ that apparatus to measure very small gas pressures within the chamber 141. In this event, the digital computer 147 would be programmed to produce an output signal which was indicative of the gas pressure within chamber 141.

Such an apparatus would also be useful for measuring the extremely low gas pressures on the fringes of outer space, in which case a vacuum apparatus would not be necessary.

I claim:

1. Apparatus of the type including a plurality of particle species, means for containing said particle species, and means for supplying to said species a traveling wave of coherent optical radiation, one of said plurality of species experiencing greater radiation pressure than another of said species at the frequency of said travelling wave, said apparatus being characterized in that said containing means has an axis along which it is substantially elongated and has a first region of restricted lateral extent along said axis and second and third regions of less restricted lateral extent than said first region on opposite sides of said first region along said axis, and said supplying means comprises a source of said optical wave and means for directing said optical wave along said axis through said third region toward said second region and for substantially filling said first region of restricted lateral extent, whereby said beam exerts pressure on said one species to concentrate said one species in said second region.

2. Apparatus of the type claimed in claim 1 in which the containing means includes in the second region a reservoir of the plurality of particle species said reservoir having a less restricted lateral extent than said first region and includes in the third region a vacuum chamber including means for removing the other particle species from said third region, and said frequency is selected to produce a resonance radiation interaction with only the one particle species.

3. Apparatus of the type claimed in claim 2 in which the containing means includes a fourth region of restricted lateral extent between said first region and said second region and said directing means includes means between said first region and said fourth region for focusing the optical traveling wave substantially to fill said fourth region.

4. Apparatus of the type claimed in claim 2 in which the reservoir of the plurality of particle species includes a gas and means for establishing a discharge through the gas to populate an excited state in a first portion of said gas, said first portion being the other particle species which does not have the resonant absorption for the optical traveling wave and therefore can diffuse through said first region through said removing means and have a population inversion created therein, the remainder of said gas being the first particle species which has said resonant absorption for said optical traveling wave and therefore is retained in said reservoir away from said first region, said apparatus being characterized by means for stimulating the emission of coherent radiation from said first portion of said gas along an axis intersecting the axis of the containing means in the first region.

5. Apparatus of the type claimed in claim 1 in which the first region of the containing means comprises means for waveguiding the traveling wave of optical radiation while admitting the passage of the plurality of particle species, the third region of the containing means comprises a reservoir of the plurality of particle species, and the plurality of particle species includes particles of varying radiation pressure cross sections ranging up to a cross section of the one particle species which cross secton enables the transport of said one particle species through said waveguiding means.

6. Apparatus of the type claimed in claim 5 in which the smallest cross-sectional dimension of the plurality of particle species is substantially larger than the wavelength of the applied radiation and said particles have no resonance radiation interactions with the traveling wave of optical radiation.

* * * * *